United States Patent
Xiao et al.

(10) Patent No.: US 11,640,213 B2
(45) Date of Patent: May 2, 2023

(54) TOUCH SENSING DEVICE, TOUCH DISPLAY PANEL AND TOUCH DISPLAY PANEL MOTHERBOARD

(71) Applicant: KunShan Go-Visionox Opto-Electronics Co., Ltd, Jiangsu (CN)

(72) Inventors: Jiangmei Xiao, Kunshan (CN); Shengzu Zhu, Kunshan (CN); Shuai Lin, Kunshan (CN)

(73) Assignee: Kunshan Go-Visionox Opto-Electronics Co., Ltd, Kunshan (CN)

(*) Notice: Subject to any disclaimer, the term of this patent is extended or adjusted under 35 U.S.C. 154(b) by 0 days.

(21) Appl. No.: 17/386,981

(22) Filed: Jul. 28, 2021

(65) Prior Publication Data

US 2021/0357065 A1 Nov. 18, 2021

Related U.S. Application Data

(63) Continuation of application No. PCT/CN2020/072586, filed on Jan. 17, 2020.

(30) Foreign Application Priority Data

Jun. 27, 2019 (CN) .......................... 201910568755.4

(51) Int. Cl.
*G06F 3/041* (2006.01)
*G06F 3/044* (2006.01)

(52) U.S. Cl.
CPC .......... *G06F 3/0412* (2013.01); *G06F 3/0443* (2019.05); *G06F 2203/04107* (2013.01)

(58) Field of Classification Search
None
See application file for complete search history.

(56) References Cited

U.S. PATENT DOCUMENTS 9,927,931 B2 * 3/2018 Park ...................... G06F 3/0443
2015/0223297 A1 8/2015 Sato
(Continued)

FOREIGN PATENT DOCUMENTS

| CN | 101872092 A | 10/2010 |
| CN | 103309098 A | 9/2013 |
| CN | 203311375 U | 11/2013 |

(Continued)

OTHER PUBLICATIONS

PCT International Search Report for PCT/CN2020/072586, dated Apr. 20, 2020, 12 pages.

(Continued)

*Primary Examiner* — Duane N Taylor, Jr.
(74) *Attorney, Agent, or Firm* — Maier & Maier, PLLC

(57) ABSTRACT

A touch sensing device, a touch display panel and a touch display panel motherboard. The touch sensing device includes: a first substrate; a plurality of patterned electrodes; and at least two lead layers, each lead layer includes a plurality of electrode leads, the plurality of electrode leads have a one-to-one correspondence relationship with the plurality of patterned electrodes, and each of the plurality of electrode leads is electrically connected to a corresponding one of the plurality of patterned electrodes.

18 Claims, 3 Drawing Sheets

(56) References Cited

U.S. PATENT DOCUMENTS

| | | | |
|---|---|---|---|
| 2016/0147325 A1* | 5/2016 | Tai | G06F 3/04164 345/173 |
| 2018/0182822 A1 | 6/2018 | Seo et al. | |

FOREIGN PATENT DOCUMENTS

| | | | |
|---|---|---|---|
| CN | 203849704 U | 9/2014 | |
| CN | 204102102 U | 1/2015 | |
| CN | 104635981 A | 5/2015 | |
| CN | 104793828 A | 7/2015 | |
| CN | 104991688 A | 10/2015 | |
| CN | 105655378 A | 6/2016 | |
| CN | 106873820 A | 6/2017 | |
| CN | 206339950 U | 7/2017 | |
| CN | 107402682 A | 11/2017 | |
| CN | 108037626 A | 5/2018 | |
| CN | 104635981 B | 6/2018 | |
| CN | 207623953 U | 7/2018 | |
| CN | 108364934 A | 8/2018 | |
| CN | 207781088 U | 8/2018 | |
| CN | 108776555 A | 11/2018 | |
| CN | 109116612 A | 1/2019 | |
| CN | 110275650 A | 9/2019 | |

OTHER PUBLICATIONS

Office Action issued for China Application No. 201910568755.4, dated Feb. 28, 2020, 9 pages.

Office Action issued for China Application No. 201910568755.4, dated Sep. 29, 2020, 8 pages.

Office Action issued for China Application No. 201910568755.4, dated May 8, 2021, 7 pages.

The Notice of the Granting of a Patent Right for an Invention and search report issued on Mar. 8, 2022, in connection with corresponding Chinese Application No. 201910568755.4 (with partial English translation); 8 pages.

The Reexamination Decision issued on Feb. 22, 2022, in connection with corresponding Chinese Application No. 201910568755.4 (with English translation); 2 pages.

The Rejection Decision issued on Nov. 3, 2021, in connection with corresponding Chinese Application No. 201910568755.4 (with English translation); 6 pages.

The Fourth Office Action dated Jul. 19, 2021, in connection with corresponding CN Application No. 201910568755.4 (8pp., including machine-generated partial English translation).

* cited by examiner

TOUCH SENSING DEVICE, TOUCH DISPLAY PANEL AND TOUCH DISPLAY PANEL MOTHERBOARD

CROSS-REFERENCE TO RELATED APPLICATION

This application is a continuation of International Application PCT/CN2020/072586, filed on Jan. 17, 2020, which claims priority from Chinese patent application No. 201910568755.4, filed on Jun. 27, 2019, both of which are incorporated herein by reference in their entireties.

TECHNICAL FIELD

This application relates to a touch sensing technology, and in particular, to a touch sensing device, a touch display panel, and a touch display panel motherboard.

BACKGROUND

With the continuous development of touch screens, touch display panels are gradually being widely used in the field of terminal devices. Touch display panels may be divided into resistive type, capacitive type, optical type, sonic type, etc. according to different sensing technologies.

The related touch display panel roughly includes a display panel and a touch sensing device in structure. The touch sensing device has a touch sensing area and a lead area located on the periphery of the touch sensing area. The touch sensing area of the touch sensing device corresponds to the display area of the display panel, and the lead area of the touch sensing device is provided with a plurality of electrode leads, so that the touch display panel has a frame around the display area that cannot display images.

SUMMARY

In a first aspect, an embodiment of the present disclosure provides a touch sensing device. The touch sensing device has a touch sensing area and a lead area located on the periphery of the touch sensing area, and includes: a first substrate; a plurality of patterned electrodes located on the first substrate and disposed in the touch sensing area; and at least two lead layers disposed in the lead area and stacked on the first substrate, wherein each of the lead layers includes a plurality of electrode leads, the plurality of electrode leads have a one-to-one correspondence relationship with the plurality of patterned electrodes, and each of the plurality of electrode leads is electrically connected to a corresponding one of the plurality of patterned electrodes.

In a second aspect, an embodiment of the present disclosure provides a touch display panel, which includes: a display panel; and a touch sensing device located on the display panel, the touch sensing device having a touch sensing area and a lead area located on the periphery of the touch sensing area, and including: a first substrate; a plurality of patterned electrodes located on the first substrate and disposed in the touch sensing area; and at least two lead layers disposed in the lead area and stacked on the substrate, wherein each of the lead layers includes a plurality of electrode leads, the plurality of electrode leads have a one-to-one correspondence relationship with the plurality of patterned electrodes, and each of the plurality of electrode leads is electrically connected to a corresponding one of the plurality of patterned electrodes.

In a third aspect, an embodiment of the present disclosure provides a touch display panel motherboard, which includes a plurality of touch display panels according to any one of the previous embodiments, wherein the plurality of touch display panels are arranged in multiple rows, and a distance between adjacent touch display panels in each row is zero.

DETAILED DESCRIPTION

In order to make the objectives, technical solutions, and advantages of the present disclosure clearer, the following further describes the present disclosure in detail with reference to the drawings and specific embodiments. The specific embodiments described here are only configured to explain the present disclosure, and not configured to limit the present disclosure. For those skilled in the art, the present disclosure can be implemented without some of these specific details.

With the development of terminal devices, there is a requirement for a narrower frame of the touch display panel. In the related art touch display panel, the width of the frame is reduced by reducing the width or spacing of the plurality electrode leads in the lead area and using manufacturing the plurality electrode leads with a transparent conductive material. However, the above method will increase the impedance of the electrode channel and reduce the product performance and production yield.

Figure 1:
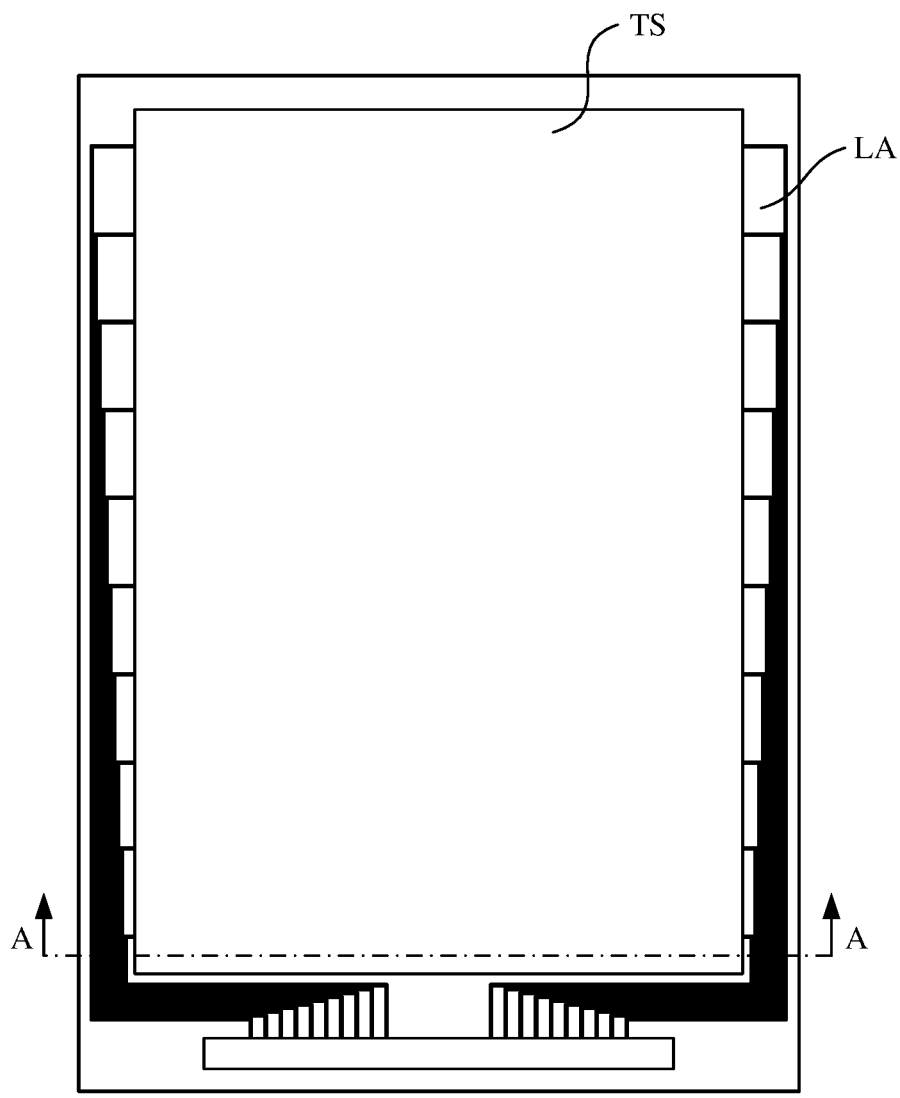
FIG. 1 is a schematic top view of a touch sensing device provided by an embodiment of the present disclosure.
Figure 2:
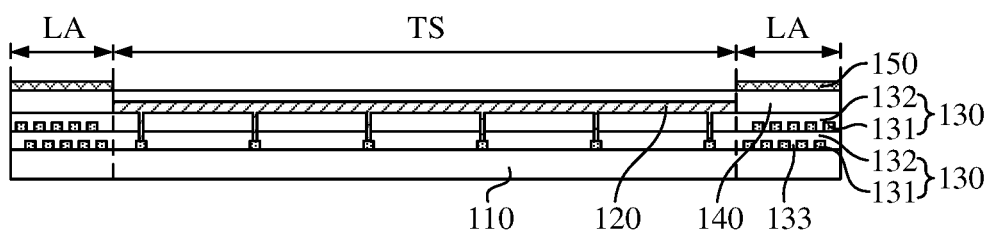
FIG. 2 is a schematic cross-sectional view of a touch sensing device provided by an embodiment of the present disclosure.

An embodiment of the present disclosure provides a touch sensing device. FIGS. 1 and 2 are a schematic top view and a schematic cross-sectional view of the touch sensing device provided by an embodiment of the present disclosure, wherein the line A-A in FIG. 1 shows a crossing position of the cross-sectional view of FIG. 2. The touch sensing device 100 has a touch sensing area TS and a lead area LA located on the periphery of the touch sensing area TS.

The touch sensing device 100 may include a first substrate 110, a plurality of patterned electrodes 120, and at least two lead layers 130. The first substrate 110 may be a transparent insulating substrate such as glass, and the first substrate 110 may also be a flexible light-transmitting insulating substrate made of polyimide (PI) or the like. The plurality of patterned electrodes 120 are located on the first substrate 110 and arranged in the touch sensing area TS. The at least two lead layers 130 are disposed in the lead area LA and stacked on the first substrate 110. Each of the lead layers 130 includes a plurality of electrode leads 131, the plurality of electrode leads 131 have a one-to-one correspondence relationship with the plurality of patterned electrodes 120, each of the plurality of electrode leads 131 is electrically connected to a corresponding one of the plurality of patterned electrodes 120, and the plurality of electrode leads 131 of adjacent lead layers 130 are insulated from each other.

The touch sensing device 100 of the embodiment of the present disclosure includes a plurality of electrode leads 131, and the plurality of electrode leads 131 are arranged in at least two layers in the thickness direction of the touch sensing device 100, thereby reducing the area occupied by the plurality of electrode leads 131 in the plane perpendicular to the thickness direction, namely reducing the area occupied by the lead area LA on the entire surface of the touch sensing device 100. When the touch sensing device 100 is applied to a touch display panel, the reduction in the area occupied by the lead area LA enables the touch display panel to achieve a narrower frame design.

The plurality of electrode leads 131 disposed in each of the lead layers 130 have gaps 133 between each other. Projections of the plurality of electrode leads 131 in one of the lead layers 130 on an adjacent lead layer 130 cover at least part of the gaps 133 disposed in the adjacent lead layer 130. In some embodiments, the positions of at least part of the electrode leads 131 in the one of the lead layers 130 correspond to the positions of the gaps 133 in the adjacent lead layers 130.

The plurality of electrode leads 131 disposed in each of the lead layers 30 have gaps 33 between each other, and projections of the plurality of electrode leads 131 of any one of the lead layers 130 on an adjacent lead layer 130 cover at least part of the gaps 133 disposed in said adjacent lead layer 130. At least part of one gap 133 may be covered by the projection of a single electrode lead 131, or may be covered by projections of at least two electrode leads 131.

As shown in FIG. 2, in this embodiment, the touch sensing device 100 may include two lead layers 130, namely a lower lead layer 130 and an upper lead layer 130, wherein the upper lead layer 130 is located above the lower lead layer 130. A plurality of electrode leads 131 of the upper lead layer 130 are arranged in a staggered manner with a plurality of electrode leads 131 of the lower lead layer 130, and each gap 133 in the lower lead layer 130 is provided correspondingly to one electrode lead 131 of the upper lead layer 130. Optionally, projections of the electrode leads 131 of the upper lead layer 130 on the lower lead layer 130 may cover a part of the corresponding gaps 133 disposed in the lower lead layer 130.

The electrode leads 131 may be made of metal conductive materials, which are opaque materials. When light is irradiated along the thickness direction of the touch sensing device 100, the electrode leads 131 in at least one of the lead layers 130 can at least partially block the light passing through the gaps 133 in the adjacent lead layer 130. When the touch sensing device 100 is applied to a touch display panel, in laser processing process such as laser sintering, the plurality of electrode leads 131 arranged in a staggered manner in the at least two lead layers 130 can block more laser light and prevent a damage to the corresponding position caused by laser irradiation under the lead layers 130 to a certain extent, thereby improving the product yield of touch display panels.

In some embodiments, the plurality of electrode leads 131 in each of the lead layers 130 are arranged at equal intervals, and a width of each of the plurality of electrode leads 131 is larger than or equal to a width of the gap 133. As shown in FIG. 2, for example, in this embodiment, the plurality of electrode leads 131 in the lower lead layer 130 are arranged at equal intervals, so that the width of each gap 133 in the lower lead layer 130 is the same. Each electrode lead 131 of the upper lead layer 130 is provided above a corresponding one of the gaps 133 in the lower lead layer 130, and the width of each of the electrode leads 131 is larger than the width of the gap 133, so that the projections of the electrode leads 131 of the upper lead layer 130 on the lower lead layer 130 can completely cover the gaps 133 in the lower lead layer 130.

Since the width of each of the electrode leads 131 is larger than or equal to the width of the gap 133, the projections of the plurality of electrode leads 131 of one of the lead layers 130 on an adjacent lead layer 130 can completely cover the gaps in the adjacent lead layer 130. When light is irradiated along the thickness direction of the touch sensing device 100, the plurality of electrode leads 131 of the at least two lead layers 130 can collectively form a more complete light-shielding area on the other side of the light source direction, so that other components disposed in the light-shielding area are protected during the laser processing process, which improves the product yield of the touch sensing device 100 and the touch display panel.

Each of the lead layers 130 also includes a first insulating layer 132 covering a plurality of electrode leads 131 to insulate the adjacent electrode leads 131 in a same layer of the lead layers 130 from each other and to insulate the electrode leads 131 of adjacent lead layers 130 from each other.

The first insulating layer 132 of each of the lead layers 130 covers the touch sensing area TS and the lead area LA of the touch sensing device 100. In some embodiments, the plurality of patterned electrodes 120 may be disposed on the first insulating layer 132 of the top lead layer 130 of the at least two lead layers 130.

The plurality of patterned electrodes 120 are made of patterned conductive materials. In some embodiments, the plurality of patterned electrodes are patterned indium tin oxide (ITO). In other embodiments, the plurality of patterned electrodes may also be made of materials with high light transmittance, for example, metal nanowires such as silver nanowires (AgNW) and graphene. The plurality of patterned electrodes 120 may form a specific pattern array to form a self-capacitance or mutual capacitance arranged in an array. When a finger or some other object touches the touch sensing device, the capacitance value of the self-capacitance or mutual capacitance near the touch point changes. The electrode leads 131 can connect the above-mentioned self-capacitance or mutual capacitance arranged in an array with a touch control circuit to change the capacitance value at each position in the array formed by the self-capacitance or mutual capacitance, so as to obtain the coordinates of each touch point.

The plurality of patterned electrodes 120 includes a plurality of driving electrodes and a plurality of sensing electrodes, and the plurality of electrode leads 131 includes a plurality of driving electrode leads and a plurality of sensing electrode leads. The plurality of driving electrode leads respectively correspond and are connected to the plurality of driving electrodes, and the plurality of sensing electrode leads respectively correspond and are connected to the plurality of sensing electrodes. The projections of the plurality of driving electrode leads on the first substrate 110 and the projections of the plurality of sensing electrode leads on the first substrate 110 do not overlap each other, thereby avoiding interference between the driving electrode leads and the sensing electrode leads.

The touch sensing device 100 further includes a second insulating layer 140, and the second insulating layer 140 is located on a side of the at least two lead layers 130 away from the first substrate 110. In this embodiment, the second insulating layer 140 covers both the touch sensing area TS and the lead area LA of the touch sensing device 100, and the second insulating layer 140 covers the plurality of patterned electrodes 120. By providing the second insulating layer 140, conductive structures such as the patterned electrodes 120 and the electrode leads 131 of the touch sensing device 100 are prevented from being exposed, and the service life and stability of the touch sensing device 100 are improved.

In some embodiments, the touch sensing device 100 further includes a shielding layer 150. The shielding layer 150 is disposed in the lead area LA. In this embodiment, the shielding layer 150 is located above the at least two lead layers 130. Specifically, the second insulating layer 140 is provided on the at least two lead layers 130, and the shielding layer 150 is disposed on the second insulating layer 140. Compared with the existing touch sensing device 100 in which a shielding layer 150 and a lead layer 130 are arranged in a same layer, in this embodiment of the present disclosure, the area of the lead area LA of the touch sensing device 100 occupying the entire surface of the touch sensing device 100 is further reduced, which facilitates the design of a narrower frame of the touch display panel. Meanwhile, the shielding layer 150 occupies one layer alone, which improves the anti-interference ability of the touch sensing device 100.

The shielding layer 150 may not be limited to being disposed above the at least two lead layers 130. The shielding layer 150 may also be disposed between any two lead layers 130, for example.

The shielding layer 150 may be located on the side of the at least two lead layers 130 away from the first substrate to avoid or reduce the electromagnetic interference of the electrodes or the electrode leads from the surrounding environment.

Optionally, the shielding layer 150 may also be located between the at least two lead layers 130. There may be only one shielding layer 150 between the lead layers 130; or there may be a plurality of shielding layers 150, wherein each of the plurality of shielding layers 150 may be located between each adjacent two lead layers 130, or may be located between some of the lead layers 130. This arrangement may avoid or reduce the electromagnetic interference of the electrodes or electrode leads from the surrounding environment, and may also avoid or reduce the electromagnetic interference between adjacent electrode leads.

The orthographic projection of the shielding layer 150 on the first substrate 110 at least partially overlaps the orthographic projections of the plurality of electrode leads 131 on the first substrate 110. The shielding layer 150 and the plurality of electrode leads 131 can collectively form a laminated light-shielding structure. When light is irradiated along the thickness direction of the touch sensing device 100, the light-shielding structure forms a light-shielding area on the other side of the light source direction. The laminated light-shielding structure can form a stronger protection for other components disposed in the light-shielding area during the laser processing process, which may further improve the product yield of the touch sensing device 100 and the touch display panel.

The material of the shielding layer may be a non-transparent conductive material, for example, a metal material such as silver (Ag), molybdenum (Mo), copper (Cu), so as to be able to reflect light.

In the above embodiment, a touch sensing device 100 including two lead layers 130 is taken as an example for describing. In other embodiments, the number of lead layers 130 may not be limited to the example in the above embodiment.

Figure 3:
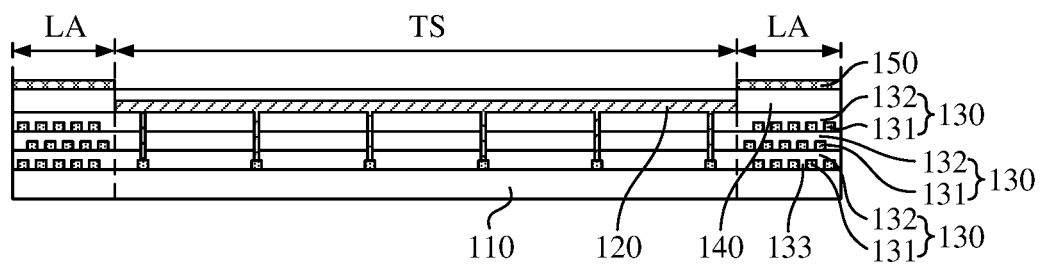
FIG. 3 is a schematic cross-sectional view of a touch sensing device provided by another embodiment of the present disclosure.

FIG. 3 is a schematic cross-sectional view of a touch sensing device provided by another embodiment of the present disclosure. The structure of the touch sensing device of this embodiment has similar parts to the structure of the touch sensing device of the previous embodiment. The differences between the two embodiments will be described below, and the similarities will not be described in detail.

In the embodiment corresponding to FIG. 3, the touch sensing device 100 has a touch sensing area TS and a lead area LA located on the outer periphery of the touch sensing area TS. The touch sensing device 100 includes a first substrate 110, a plurality of patterned electrodes 120, and at least two lead layers 130. Each of the lead layers 130 includes a plurality of electrode leads 131 and a first insulating layer 132 covering the plurality of electrode leads 131. Different from the previous embodiment, the touch sensing device 100 of this embodiment includes three lead layers 130.

The three lead layers 130 may be, for example, a lower lead layer 130, a middle lead layer 130, and an upper lead layer 130 stacked from bottom to top. In this embodiment, the plurality of electrode leads 131 of the middle lead layer 130 are arranged in a staggered manner with the plurality of electrode leads 131 of the lower lead layer 130, and each gap 133 in the lower lead layer 130 is provided correspondingly to one electrode lead 131 of the middle lead layer 130. The plurality of electrode leads 131 of the upper lead layer 130 are arranged in a staggered manner with the plurality of electrode leads 131 of the middle lead layer 130, and each gap 133 in the middle lead layer 130 is provided correspondingly to one electrode lead 131 of the upper lead layer 130.

When light is irradiated along the thickness direction of the touch sensing device 100, the plurality of electrode leads 131 in at least one of the lead layers 130 can at least partially block the light passing through the gaps 133 in the adjacent lead layer 130. The positions of the plurality of electrode leads 131 of the upper lead layer 130 correspond to the positions of the plurality of electrode leads 131 of the lower lead layer 130, so that the arrangement of the multiple lead layers 130 in a staggered manner is more reasonable while the light is shielded, thereby ensuring that the lead area LA occupies the entire surface of the touch sensing device 100 in a small range. When the touch sensing device 100 is applied to a touch display panel, the reduction in the area occupied by the lead area LA enables the touch display panel to achieve a narrower frame design.

The plurality of electrode leads 131 in each of the lead layers 130 are arranged at equal intervals, and the width of each of the electrode leads 131 is larger than or equal to the width of the gap 133, so that the projections of the electrode leads 131 of one of the lead layers 130 on an adjacent lead layer 130 can completely cover gaps in the adjacent lead layer 130. When light is irradiated along the thickness direction of the touch sensing device 100, the plurality of electrode leads 131 of the multiple lead layers 130 can collectively form a more complete light-shielding area on the other side of the light source direction, so that other components disposed in the light-shielding area are protected during the laser processing process, which improves the product yield of the touch sensing device 100 and the touch display panel.

In the touch sensing device 100 of the previous embodiment, the touch sensing device 100 includes three lead layers 130. In some other embodiments, according to design requirements, the lead layers 130 may also be adjusted to four layers, five layers, and other numbers. Accordingly, the plurality of electrode leads 131 connected to the plurality patterned electrodes 120 are also disposed in multiple layers arranged in the thickness direction of the touch sensing device 100. By disposing the plurality of electrode leads 131 in multiple layers, the area occupied by the plurality of electrode leads 131 in the plane perpendicular to the thickness direction of the touch sensing device 100 is further reduced, that is, the area occupied by the lead area LA on the entire surface of the touch sensing device 100 is reduced, which further facilitates the design of a narrower frame of the touch display panel including the touch sensing device 100.

Figure 4:
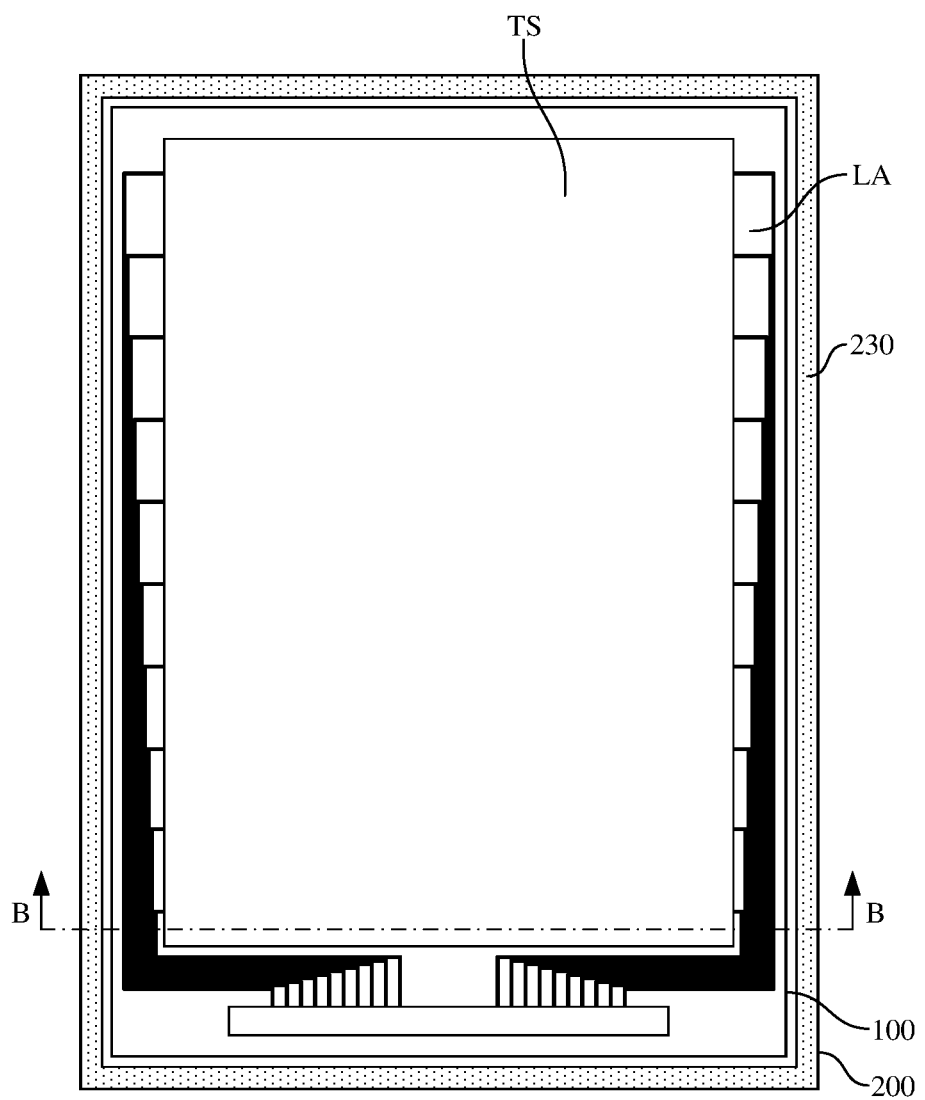
FIG. 4 is a schematic top view of a touch display panel provided by an embodiment of the present disclosure.
Figure 5:
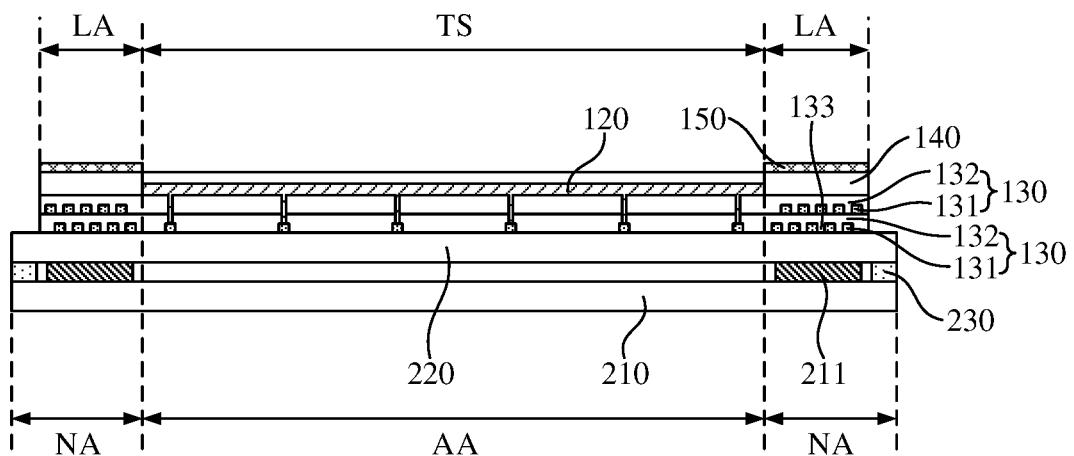
FIG. 5 is a schematic cross-sectional view of a touch display panel provided by an embodiment of the present disclosure.

An embodiment of the present disclosure also provides a touch display panel. FIGS. 4 and 5 are a schematic top view and a schematic cross-sectional view of the touch display panel provided by an embodiment of the present disclosure, wherein the line B-B in FIG. 4 shows crossing position of the cross-sectional view of FIG. 5. The touch display panel 1000 includes a display panel 200 and a touch sensing device 100, and the touch sensing device 100 is located on the display panel 200. In some embodiments, the touch sensing device 100 may be the touch sensing device 100 of any of the previous embodiments.

The touch sensing device 100 has a touch sensing area TS and a lead area LA located on the periphery of the touch sensing area TS. The touch sensing device 100 includes a first substrate, a plurality of patterned electrodes 120, and at least two lead layers 130.

The plurality of patterned electrodes 120 are located on the first substrate and disposed in the touch sensing area TS. The at least two lead layers 130 are disposed in the lead area LA and stacked on the first substrate. Each of the lead layers 130 includes a plurality of electrode leads 131, the plurality of electrode leads 131 have a one-to-one correspondence relationship with the plurality of patterned electrodes 120, each of the plurality of electrode leads 131 is electrically connected to a corresponding one of the plurality of patterned electrodes 120, and the plurality of electrode leads 131 of adjacent lead layers 130 are insulated from each other.

According to the touch display panel 1000 of the embodiment of the present disclosure, the touch sensing device 100 includes at least two lead layers 130, and each of the lead layers 130 includes a plurality of electrode leads 131, so that the plurality of electrode leads 131 of the touch sensing device 100 are arranged in at least two layers in a thickness direction thereof, thereby reducing the area occupied by the plurality of electrode leads 131 in a plane perpendicular to the thickness direction, that is, reducing the area occupied by the lead area LA on the entire surface of the touch sensing device 100. Furthermore, the reduction in the area occupied by the lead area LA enables the touch display panel 1000 to achieve a narrower frame design.

Each of the lead layers 130 also includes a first insulating layer 132 covering a plurality of electrode leads 131 to insulate the adjacent electrode leads 131 in a same layer of the lead layers 130 from each other and to insulate the electrode leads 131 of adjacent lead layers 130 from each other.

The first insulating layer 132 of each of the lead layers 130 covers the touch sensing area TS and the lead area LA of the touch sensing device 100. In some embodiments, the plurality of patterned electrodes 120 may be disposed on the first insulating layer 132 of the top lead layer 130 of the at least two lead layers 130.

The display panel 200 includes a second substrate 210 and a packaging substrate 220. The packaging substrate 220 is located on the second substrate 210 and bonded with the second substrate 210 by a packaging adhesive 230.

The second substrate 210 and the packaging substrate 220 may be transparent insulating substrates such as glass. In some other embodiments, the second substrate 210 and the packaging substrate 220 may also be flexible light-transmitting insulating substrates such as PI.

The packaging substrate 220 is also used as the first substrate of the touch sensing device 100, and a plurality of patterned electrodes 120, lead layers 130 and the like are formed on the packaging substrate 220. Of course, the first substrate of the touch sensing device 100 may also be disposed on the packaging substrate 220, and the disposition methods include but are not limited to bonding, mechanical connection, etc., which are not limited herein.

The display panel 200 has a display area AA and a non-display area NA located on the periphery of the display area AA. The touch sensing area TS of the touch sensing device 100 corresponds to the display area AA of the display panel 200. The packaging adhesive 230 is disposed around in the non-display area NA.

The second substrate 210 is, for example, an array substrate of the display panel 200. In some embodiments, it includes a pixel circuit and a light-emitting element located in the display area AA, and the light-emitting element may be, for example, an organic light-emitting diode (OLED). In some embodiments, the second substrate 210 includes a wiring structure 211 located in the non-display area NA, and the wiring structure 211 is, for example, a wiring structure electrically connected to the cathode of the OLED.

The orthographic projections of the plurality of electrode leads 131 of the at least two lead layers 130 on the second substrate 210 at least partially overlap the wiring structure 211, and the packaging adhesive 230 is located on the outer peripheral side of the wiring structure 211.

During the production process of the touch display panel 1000, the packaging adhesive 230 may be bonded to the second substrate 210 and the packaging substrate 220 by laser sintering. When the laser sintering width is large, since the orthographic projections of the electrode leads 131 on the second substrate 210 at least partially overlap the wiring structure 211, it can block at least part of the excessively wide laser from irradiating the wiring structure 211 and reduce a damage on the wiring structure 211, thereby increasing the service life of the display panel 200 and the touch display panel 1000.

The plurality of electrode leads 131 in each of the lead layers 130 have gaps 133 between each other. The projections of the plurality of electrode leads 131 in one of the lead layers 130 on an adjacent lead layer 130 cover at least part of the gaps 133 disposed in the adjacent lead layer 130. In some embodiments, the positions of at least part of the electrode leads 131 in one of the lead layers 130 correspond to the positions of the gaps 133 in the adjacent lead layer 130.

As shown in FIG. 5, in this embodiment, the touch sensing device 100 may include two lead layers 130, namely a lower lead layer 130 and an upper lead layer 130, wherein the upper lead layer 130 is located above the lower lead layer 130. A plurality of electrode leads 131 of the upper lead layer 130 are arranged in a staggered manner with a plurality of electrode leads 131 of the lower lead layer 130, and each gap 133 in the lower lead layer 130 is provided correspondingly to one electrode lead 131 of the upper lead layer 130. In some other embodiments, the number of lead layers 130 included in the touch sensing device 100 is not limited to two layers, and may also be three layers, four layers, and other numbers.

The electrode lead 131 may be made of a metal conductive material, which in some embodiments is an opaque material. When light is irradiated along the thickness direction of the display panel 1000, the electrode leads 131 in at least one of the lead layers 130 can at least partially block the light passing through the gaps 133 in the adjacent lead layer 130. When the touch display panel 1000 is in a laser processing process such as a laser sintering, the staggered arrangement of the plurality of electrode leads 131 in the at least two lead layers 130 enables the collection of orthographic projections of the plurality of electrode leads 131 on the second substrate 210 and the wiring structure 211 to overlap more, so as to block more laser light and prevent laser light from irradiating the wiring structure 211 under the lead layers 130 to a certain extent, thereby reducing a damage to the wiring structure 211 and improving the product yield of the touch display panel 1000.

In some embodiments, the plurality of electrode leads 131 in each of the lead layers 130 are arranged at equal intervals, and the width of each of the plurality of electrode leads 131 is larger than or equal to the width of the gap 133. As shown in FIG. 5, for example, in this embodiment, the plurality of electrode leads 131 in the lower lead layer 130 are arranged at equal intervals, so that the width of each gap 133 in the lower lead layer 130 is the same. Each electrode lead 131 of the upper lead layer 130 is provided above a corresponding one of the gaps 133 in the lower lead layer 130, and the width of each of the electrode leads 131 is larger than the width of the gap 133, so that the projections of the electrode leads 131 of the upper lead layer 130 on the lower lead layer 130 can completely cover the gaps 133 in the lower lead layer 130.

Since the width of each of the electrode leads 131 is larger than or equal to the width of the gap 133, the electrode leads 131 of one of the lead layers 130 can completely cover the gaps in the adjacent lead layer 130. When light is irradiated along the thickness direction of the touch sensing device 100, the plurality of electrode leads 131 of the at least two lead layers 130 collectively form a more complete light-shielding area on the other side of the light source direction. In some embodiments, the more complete light-shielding area can cover the wiring structure 211, thereby forming protection for the wiring structure 211 during the laser processing process, which improves the product yield of the touch display panel 1000.

The plurality of patterned electrodes 120 includes a plurality of driving electrodes and a plurality of sensing electrodes, and the plurality of electrode leads 131 includes a plurality of driving electrode leads and a plurality of sensing electrode leads. The plurality of driving electrode leads respectively correspond and are connected to the plurality of driving electrodes, and the plurality of sensing electrode leads respectively correspond and are connected to the plurality of sensing electrodes. The projections of the plurality of driving electrode leads on the first substrate 110 and the projections of the plurality of sensing electrode leads on the first substrate 110 do not overlap each other, thereby avoiding interference between the driving electrode leads and the sensing electrode leads.

The touch sensing device 100 further includes a second insulating layer 140, and the second insulating layer 140 is located on a side of the at least two lead layers 130 away from the first substrate 110. In this embodiment, the touch sensing area TS and the lead area LA of the touch sensing device 100 are covered, and the second insulating layer 140 covers the plurality of patterned electrodes 120. By providing the second insulating layer 140, conductive structures such as the patterned electrodes 120 and the electrode leads 131 of the touch sensing device 100 are prevented from being exposed, and the service life and stability of the touch sensing device 100 are improved.

The touch sensing device 100 further includes a shielding layer 150, wherein the shielding layer 150 is disposed in the lead area LA.

The shielding layer 150 is located above the at least two lead layers 130. In this embodiment, the second insulating layer 140 is provided on the at least two lead layers 130, and the shielding layer 150 is disposed on the second insulating layer 140. Compared with the existing touch sensing device 100 in which a shielding layer 150 and a lead layer 130 are arranged in a same layer, in this embodiment of the present disclosure, the area of the lead area LA of the touch sensing device 100 occupying the entire surface of the touch sensing device 100 is further reduced, which facilitates the design of a narrower frame of the touch display panel. Meanwhile, the shielding layer 150 occupies one layer alone, which improves the anti-interference ability of the touch sensing device 100.

The shielding layer 150 may not be limited to being disposed above the at least two lead layers 130. In some other embodiments, the shielding layer 150 may also be disposed between any two lead layers 130, for example.

The shielding layer 150 may be located on the side of the at least two lead layers 130 away from the first substrate to avoid or reduce the electromagnetic interference of the electrodes or the electrode leads from the surrounding environment.

The shielding layer 150 may also be located between the at least two lead layers 130. There may be only one shielding layer 150 between the lead layers 130; or there may be a plurality of shielding layers 150, wherein each of the plurality of shielding layers 150 may be located between each adjacent two lead layers 130, or may be located between some of the lead layers 130. This arrangement may avoid or reduce the electromagnetic interference of the electrodes or electrode leads from the surrounding environment, and may also avoid or reduce the electromagnetic interference between adjacent electrode leads.

The orthographic projection of the shielding layer 150 on the second substrate 210 at least partially overlaps the wiring structure 211, so that, during the laser sintering process of the touch display panel 1000, the shielding layer 150 can block at least part of the excessively wide laser from irradiating the wiring structure 211 and further reduce the damage to the wiring structure 211, thereby increasing the service life of the touch display panel 1000.

The material of the shielding layer may be a non-transparent conductive material, for example, a metal material such as silver (Ag), molybdenum (Mo), copper (Cu), so as to be able to reflect light.

Figure 6:
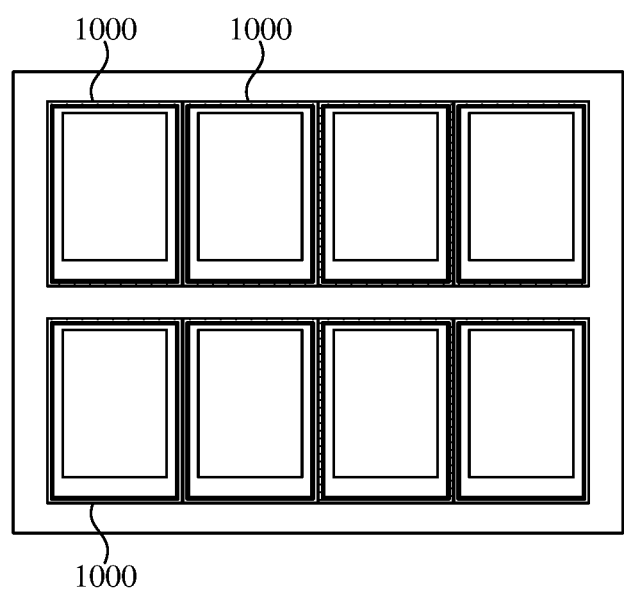
FIG. 6 is a schematic top view of a touch display panel motherboard provided by an embodiment of the present disclosure.

An embodiment of the present disclosure further provides a touch display panel motherboard. FIG. 6 is a schematic top view of the touch display panel motherboard provided by an embodiment of the present disclosure. The touch display panel motherboard may include a plurality of touch display panels 1000, wherein the touch display panel 1000 may be the touch display panel 1000 of any of the above embodiments. The plurality of touch display panels 1000 are arranged in multiple rows, and the distance between adjacent touch display panels 1000 in each row is zero, that is, the adjacent touch display panels 1000 in each row are disposed in a zero-spacing manner.

According to the touch display panel motherboard of the embodiment of the present disclosure, the plurality of touch display panels 1000 are arranged in multiple rows, and adjacent touch display panels 1000 in each row are disposed in a zero-spacing manner, thereby improving the utilization rate of the touch display panel motherboard and reducing the production cost.

Optionally, each touch display panel 1000 includes a display panel 200 and a touch sensing device 100 located on the display panel 200.

The touch sensing device 100 has a touch sensing area TS and a lead area LA located on the periphery of the touch sensing area TS. The touch sensing device 100 includes a first substrate, a plurality of patterned electrodes 120, and at least two lead layers 130. The plurality of patterned electrodes 120 are located on the first substrate and disposed in the touch sensing area TS. The at least two lead layers 130 are disposed in the lead area LA and stacked on the first substrate. Each of the lead layers 130 includes a plurality of electrode leads 131, the plurality of electrode leads 131 have a one-to-one correspondence relationship with the plurality of patterned electrodes 120, each electrode lead 131 is electrically connected to a corresponding one of the plurality of patterned electrodes 120, and the electrode leads 131 of adjacent lead layers 130 are insulated from each other.

The display panel 200 includes a second substrate 210 and a packaging substrate 220. The packaging substrate 220 is located on the second substrate 210 and bonded with the second substrate 210 by a packaging adhesive 230.

The collection of the orthographic projections of the plurality of electrode leads 131 of the at least two lead layers 130 on the second substrate 210 at least partially overlap the wiring structure 211, and the packaging adhesive 230 is located on the outer peripheral side of the wiring structure 211.

The touch sensing device 100 includes a shielding layer 150, wherein the shielding layer 150 is disposed in the lead area LA. The material of the shielding layer may be a non-transparent conductive material, for example, a metal material such as silver (Ag), molybdenum (Mo), copper (Cu), so as to be able to reflect light.

According to the touch display panel motherboard of the embodiment of the present disclosure, the plurality of electrode leads 131 and/or the shielding layer 150 can block at least part of the excessively wide laser from irradiating the wiring structure 211, thereby reducing the damage to the wiring structure 211 by the excessively wide laser during the laser sintering process of the touch display panels 1000 arranged in the zero-spacing manner, which facilitates the implementation of the zero-spacing arrangement of the touch display panels 1000.

According to the above-mentioned embodiments of this application, these embodiments do not describe all the details in detail, nor do they limit this application to only the specific embodiments described. Obviously, many modifications and changes can be made based on the above description. This description selects and specifically describes these embodiments in order to better explain the principles and practical uses of this application, so that those skilled in the art can make good use of this application and make modifications based on this application. This application is only limited by the claims and their full scope and equivalents.

What is claimed is:

1. A touch sensing device, having a touch sensing area and a lead area located on a periphery of the touch sensing area and comprising:

a first substrate;

a plurality of patterned electrodes, located on the first substrate and disposed in the touch sensing area; and at least two lead layers, disposed in the lead area and stacked on the first substrate, wherein a first lead layer in the at least two lead layers is located on and in contact with the first substrate and wherein a second lead layer in the at least two lead layers is located on and in contact with the first lead layer, wherein each of the lead layers comprises a plurality of electrode leads, the plurality of electrode leads have a one-to-one correspondence relationship with the plurality of patterned electrodes, and each of the plurality of electrode leads is electrically connected to a corresponding one of the plurality of patterned electrodes;

wherein each of the lead layers further comprises a first insulating layer covering the plurality of electrode leads; and the touch sensing device further comprises:

a second insulating layer, located on a side of the at least two lead layers away from the first substrate and covering both the lead area and the touch sensing area.

2. The touch sensing device according to claim 1, wherein the plurality of electrode leads disposed in each of the lead layers have gaps between each other, and projections of the plurality of electrode leads in one of the lead layers on an adjacent lead layer cover at least part of the gaps in said adjacent lead layer.

3. The touch sensing device according to claim 2, wherein the plurality of electrode leads in each of the lead layers are arranged at equal intervals and a width of each of the plurality of electrode leads is larger than or equal to a width of the gap.

4. The touch sensing device according to claim 2, wherein the plurality of electrode leads disposed in each of the lead layers have gaps between each other, and projections of the plurality of electrode leads of any one of the lead layers on an adjacent lead layer cover at least part of the gaps disposed in said adjacent lead layer.

5. The touch sensing device according to claim 1, further comprising:

a shielding layer, located between the at least two lead layers and disposed in the lead area, wherein an orthographic projection of the shielding layer on the first substrate at least partially overlaps orthographic projections of the plurality of electrode leads on the first substrate.

6. A touch display panel, comprising:

a display panel; and a touch sensing device according to claim 1, located on the display panel.

7. The touch display panel according to claim 6, wherein the plurality of electrode leads in each of the lead layers have gaps between each other, wherein projections of the plurality of electrode leads in one of the lead layers on an adjacent lead layer cover at least part of the gaps in said adjacent lead layer.

8. The touch display panel according to claim 7, wherein the plurality of electrode leads in each of the lead layers are arranged at equal intervals, and a width of each of the plurality of electrode leads is larger than or equal to a width of the gap.

9. The touch display panel according to claim 6, wherein the touch sensing device further comprises:
a shielding layer, located between the at least two lead layers and disposed in the lead area, wherein an orthographic projection of the shielding layer on the first substrate at least partially overlaps orthographic projections of the plurality of electrode leads on the first substrate.

10. The touch display panel according to claim 6, wherein the display panel comprises a second substrate, said second substrate having a packaging adhesive provided thereon.

11. The touch display panel according to claim 10, wherein the touch display panel is arranged according to a configuration:
wherein the first substrate is a packaging substrate located on the second substrate and bonded to the second substrate by the packaging adhesive.

12. The touch display panel according to claim 10, wherein the display panel comprises a display area and a non-display area located on a periphery of the display area, and the touch sensing area of the touch sensing device corresponds to the display area of the display panel;
the packaging adhesive is disposed around in the non-display area and the second substrate comprises a wiring structure located in the non-display area,
wherein orthographic projections of the plurality of electrode leads of the at least two lead layers on the second substrate at least partially overlap the wiring structure and the packaging adhesive is located on an outer peripheral side of the wiring structure.

13. The touch display panel according to claim 12, wherein the touch sensing device further comprises:
a shielding layer, located between the at least two lead layers and disposed in the lead area, wherein an orthographic projection of the shielding layer on the second substrate at least partially overlaps the wiring structure.

14. A touch display panel motherboard, comprising a plurality of touch display panels according to claim 6, wherein the plurality of touch display panels are arranged in multiple rows, and a distance between adjacent touch display panels in each row is zero.

15. The touch display panel motherboard according to claim 14, wherein the plurality of electrode leads are made of metal conductive and opaque materials.

16. The touch display panel motherboard according to claim 14, wherein the plurality of electrode leads comprises a plurality of driving electrode leads and a plurality of sensing electrode leads, and projections of the plurality of driving electrode leads on the first substrate and projections of the plurality of sensing electrode leads on the first substrate do not overlap each other.

17. The touch display panel motherboard according to claim 14, wherein the touch sensing device comprises a shielding layer located on a side of the at least two lead layers away from the first substrate and disposed in the lead area, and an orthographic projection of the shielding layer on the first substrate at least partially overlaps orthographic projections of the plurality of electrode leads on the first substrate.

18. The touch display panel motherboard according to claim 14, wherein the first insulating layer covers the touching sensing area and the lead area of the touch sensing device.

* * * * *